(12) United States Patent
Hayashi et al.

(10) Patent No.: US 7,868,065 B2
(45) Date of Patent: Jan. 11, 2011

(54) PRODUCTION PROCESS OF COLORED RESIN POWDER

(75) Inventors: Masahiro Hayashi, Yokohama (JP); Motomu Kita, Yokohama (JP); Hideyuki Tezen, Yokohama (JP); Yuriko Minami, Yokohama (JP)

(73) Assignee: Nippon Polyurethane Industry Co., Ltd, Tokyo (JP)

( * ) Notice: Subject to any disclaimer, the term of this patent is extended or adjusted under 35 U.S.C. 154(b) by 327 days.

(21) Appl. No.: 12/162,058

(22) PCT Filed: May 30, 2006

(86) PCT No.: PCT/JP2006/310795

§ 371 (c)(1),
(2), (4) Date: Jul. 24, 2008

(87) PCT Pub. No.: WO2007/086153

PCT Pub. Date: Aug. 2, 2007

(65) Prior Publication Data

US 2009/0012219 A1    Jan. 8, 2009

(30) Foreign Application Priority Data

Jan. 25, 2006    (JP) .............................. 2006-015986

(51) Int. Cl.
*C08J 3/20* (2006.01)
*C08J 3/205* (2006.01)
*C08K 5/101* (2006.01)
*C08K 5/12* (2006.01)
*C08L 75/00* (2006.01)

(52) U.S. Cl. ........................ 523/351; 524/308; 524/311; 524/315; 524/904

(58) Field of Classification Search .................. 523/351; 524/308, 315, 904
See application file for complete search history.

(56) References Cited

U.S. PATENT DOCUMENTS

| | | | | | |
|---|---|---|---|---|---|
| 4,083,831 | A | * | 4/1978 | Santosusso | .................. 528/52 |
| 4,307,004 | A | * | 12/1981 | Schuhmacher et al. | ...... 523/337 |
| 4,985,490 | A | * | 1/1991 | Rosthauser et al. | ......... 524/871 |
| 5,688,863 | A | * | 11/1997 | Kirchmeyer et al. | ........ 524/839 |

FOREIGN PATENT DOCUMENTS

| | | |
|---|---|---|
| JP | 47-30745 A | 11/1972 |
| JP | 57-180664 A | 11/1982 |
| JP | 11-172097 A | 6/1999 |
| JP | 2002-20630 A | 1/2002 |
| JP | 2004-67954 A | 3/2004 |
| JP | 2005-154451 A | 6/2005 |
| WO | 2005/049731 A1 | 6/2005 |

* cited by examiner

*Primary Examiner*—Tae H Yoon
(74) *Attorney, Agent, or Firm*—Sughrue Mion, PLLC

(57) ABSTRACT

A production process of colored resin powder, comprising a coloring step of mixing 0.5 to 40% by mass of a colorant (b1) with 99.5 to 60% by mass of a non-phthalic acid plasticizer (b2) to prepare a colored paste (B) and adding and mixing the colored paste (B) into a powdery thermoplastic polyurethane-urea resin (A), wherein the amounts of the colorant (b1) and the plasticizer (b2) contained in the colored paste (B) added to the powdery thermoplastic polyurethane-urea resin (A) are 0.1 to 5 parts by mass and 1 to 20 parts by mass, respectively, per 100 parts by mass of the thermoplastic polyurethane-urea resin. According to the production process, there can be provided colored resin powder, which is free from color mottling (color unevenness) on its surface and does not cause smearing of a molded product due to separation and falling of the colorant upon a molding process or the like.

6 Claims, No Drawings

PRODUCTION PROCESS OF COLORED RESIN POWDER

TECHNICAL FIELD

The present invention relates to a process for producing colored resin powder by coloring a powdery polyurethane-urea resin.

BACKGROUND ART

As a process for coloring a powdery polyurethane resin, there has been known a process, in which a pigment is added and mixed into this resin.

A process, in which a plasticizer is added and mixed together with a pigment into a powdery polyurethane resin, has also been introduced (see Patent Document 1).

Further, a process, in which a pigment is added and mixed into a powdery polyurethane resin, and a plasticizer is then added thereto and further mixed, has been introduced (see Patent Document 2).

Patent Document 1: Japanese Patent Application Laid-Open No. 2004-67954

Patent Document 2: Japanese Patent Application Laid-Open No. 2005-154451

DISCLOSURE OF THE INVENTION

Problems to be Solved by the Invention

However, polyurethane resins (colored resin powders) colored in accordance with the conventionally known processes involve a problem that color mottling (color unevenness) occurs on their surfaces.

In addition, when colored resin powder obtained in accordance with the conventionally known process is used to conduct, for example, slush molding, in some cases, a pigment may be separated from the colored resin powder when a container, in which the colored resin powder is contained, is rotated, whereby dotted smears may be caused on the resulting molded product by aggregates of the pigment separated from the colored resin powder.

Further, when a phthalic acid plasticizer is used in the process described in Patent Document 1 or 2 making use of a plasticizer in combination, a working environment in a molding process making use of the resulting colored resin powder becomes poor, for example, the environment is exposed to vapor of the plasticizer at the time an electric furnace is opened in slush molding.

The present invention has been made on the basis of the foregoing circumstances and has as its object the provision of a production process of colored resin powder, which is free from color mottling (color unevenness) on its surface and does not cause smearing of a molded product due to separation and falling of a colorant upon a molding process or the like.

Means for the Solution of the Problems

The production process according to the present invention is a production process of colored resin powder, comprising a coloring step of mixing 0.5 to 40% by mass of a colorant (b1) with 99.5 to 60% by mass of a non-phthalic acid plasticizer (b2) to prepare a colored paste (B) and adding and mixing the colored paste (B) into a powdery thermoplastic polyurethane-urea resin (A), wherein the amounts of the colorant (b1) and the plasticizer (b2) contained in the colored paste (B) added to the powdery thermoplastic polyurethane-urea resin (A) are 0.1 to 5 parts by mass and 1 to 20 parts by mass, respectively, per 100 parts by mass of the thermoplastic polyurethane-urea resin.

In the production process according to the present invention, the following embodiments are preferred.

(1) The plasticizer (b2) is a monocarboxylic mono-ester or monocarboxylic diester of polyoxyethylene glycol.

(2) The plasticizer (b2) is an aliphatic dicarboxylic diester, and in particular, an ester of an aliphatic dicarboxylic acid with an alkoxy group-containing monool.

(3) The plasticizer (b2) is a monoester of a polyoxy-alkylene monoalkyl ether with a monocarboxylic acid.

(4) The plasticizer (b2) is a trimellitic triester.

EFFECTS OF THE INVENTION

According to the production process of the present invention, a necessary and sufficient amount of the colorant can be caused to evenly adhere to the whole surface of the resin powder (thermoplastic polyurethane-urea resin) to obtain colored resin power in a surface state free from color mottling (color unevenness).

In addition, even when the resulting colored resin powder is used to carry out molding repeatedly, separation and falling of the colorant can be avoided to prevent smearing of the resulting molded products.

BEST MODE FOR CARRYING OUT THE INVENTION

The present invention will hereinafter be described in detail.

The production process according to the present invention is a process for producing colored resin powder by coloring a powdery thermoplastic polyurethane-urea resin (A).

<Powdery Thermoplastic Polyurethane-Urea Resin (A)>

The powdery thermoplastic polyurethane-urea resin (A) is colorless (natural) resin powder subjected to coloring.

The average particle diameter of the thermoplastic polyurethane-urea resin (A) is generally smaller than 1,000 μm, preferably 10 to 500 μm, more preferably 100 to 200 μm.

The shape of the thermoplastic polyurethane-urea resin (A) is preferably substantially spherical, and specifically having a sphericity (major axis/minor axis ratio) lower than 1.3, more preferably lower than 1.15.

The thermoplastic polyurethane-urea resin (A) can be prepared by subjecting an isocyanate group-terminated prepolymer and water to a chain extending reaction in a dispersion medium and separating and drying the thus-obtained resin.

In the production process according to the present invention, examples of a particularly preferable powdery thermoplastic polyurethane-urea resin (A) include that obtained in accordance with the process described in Japanese Patent Application No. 2005-311076, namely, a production process of a powdery thermoplastic polyurethane-urea resin, which comprises the steps of causing a high-molecular weight polyol (a), an organic polyisocyanate (b), a monofunctional active hydrogen group-containing compound (c) having an active hydrogen group and a hydrocarbon group having 4 to 12 carbon atoms and a bifunctional active hydrogen group-containing compound (d) to react and subjecting the resultant isocyanate group-terminated prepolymer and water (e) to a chain extending reaction in a non-aqueous dispersion medium to form a polyurethane-urea resin, wherein when the number of moles of an active hydrogen group possessed by the high-molecular weight polyol (a) subjected to the reaction is represented by A, the number of moles of the active hydrogen group possessed by the monofunctional active hydrogen group-containing compound (c) is represented by x1, the number of moles of the active hydrogen group possessed by the bifunctional active hydrogen group-containing compound (d) is represented by x2, and the number of moles of an active hydrogen group possessed by water (e) is represented by x3, the conditions indicated by the following formulas [1] to [3] are satisfied.

$$0.3 \leq (x1+x2+x3)/A \leq 1.5 \quad \text{formula [1]}$$

$$5/95 \leq x1/(x2+x3) \leq 25/75 \quad \text{formula [2]}$$

$$3/97 \leq x2/x3 \leq 67/33 \quad \text{formula [3]}$$

<Colored Paste (B)>

In the production process according to the present invention, the colorant (b1) is first mixed with the non-phthalic acid plasticizer (b2) to prepare the colored paste (B).

The colorant (b1) used in the present invention contains a powder pigment (b1-1) and a pigment dispersant (b1-2).

No particular limitation is imposed on the powder pigment (b1-1), and any publicly known organic pigment and/or inorganic pigment may be used.

Examples of the organic pigment include insoluble azo pigments, copper phthalocyanine pigments and quinacridone pigments. Examples of the inorganic pigment include chromates, ferrocyanide compounds, metal oxides (titanium oxide, zinc oxide, etc.), metal salts (sulfates, silicates, carbonates, phosphates, etc.), metal powders and carbon black.

Examples of the pigment dispersant (b1-2) include substances having a pigment dispersing effect, such as resins such as low-molecular weight polyethylene and petroleum resins, inorganic dispersants such as silica and calcium carbonate, and surface treating agents such as silane coupling agents.

The powder pigment (b1-1) involves such problems as it is not sufficiently dispersed by itself, high in flying tendency and poor in workability upon mixing with the thermoplastic polyurethane-urea resin. Therefore, it is mixed and dispersed in the pigment dispersant (b1-2) comprising the resin or the like, and the resultant dispersion is then ground to form fine particles, or mixed and dispersed in the pigment dispersant (b1-2) comprising the inorganic dispersant, or treated with the pigment dispersant (b1-2) comprising the surface treating agent.

In the colorant (b1), the proportions of the powder pigment (b1-1) and the pigment dispersant (b1-2) are generally 20 to 80% by mass for the powder pigment (b1-1) and 80 to 20% by mass for the pigment dispersant (b1-2).

In the production process according to the present invention, as the plasticizer constituting the colored paste (B), the non-phthalic acid plasticizer (b2) is used, not a phthalic ester that is regarded as harmful as environmental hormone.

Examples of the non-phthalic acid plasticizer (b2) in the present invention include monocarboxylic monoesters and monocarboxylic diesters of polyoxyethylene glycol (PEG), aliphatic dicarboxylic diesters, monoesters of a polyoxyalkylene monoalkyl ether with a monocarboxylic acid, trimellitic triesters, aliphatic phosphoric esters, aromatic phosphoric esters, and halogen-containing aliphatic phosphoric esters.

The number average molecular weight of PEG forming the "monocarboxylic monoesters of PEG" or the "monocarboxylic diesters of PEG" is generally 150 to 1,000, preferably 200 to 800.

Examples of the monocarboxylic acids forming the monocarboxylic esters include monocarboxylic acids having 6 to 20 carbon atoms, such as benzoic acid, 2-ethylhexanoic acid, lauric acid, linolenic acid, linoleic acid, oleic acid, stearic acid, myristic acid and arachidonic acid.

Specific preferable examples of the monocarboxylic esters include PEG-dibenzoate, PEG-di-2-ethylhexanoate and PEG-dioleate.

Examples of aliphatic dicarboxylic acids forming the "aliphatic dicarboxylic diesters" include adipic acid, sebacic acid, glutaric acid, succinic acid, azelaic acid, hexahydrophthalic acid, hexahydroisophthalic acid, hexahydroterephthalic acid, fumaric acid, maleic acid and naphthalenedicarboxylic acid.

Examples of monools forming the aliphatic dicarboxylic diesters include methanol, ethanol, propanol, butanol, n-octanol, 2-ethylhexyl alcohol, n-decanol, ethyl cellosolve, ethyl carbitol, isononyl alcohol, isodecyl alcohol, methoxyethyl alcohol, ethoxyethyl alcohol, ethoxyethoxyethyl alcohol, butoxyethoxyethyl alcohol, butoxyethyl alcohol and butyl diglycol.

Specific preferable examples of the aliphatic dicarboxylic diesters include diethoxyethyl adipate, diethoxyethoxyethyl adipate, dibutoxyethoxyethyl adipate, dibutoxyethyl adipate, diisononyl adipate, diisodecyl adipate, bis(butyl diglycol) adipate, di-2-ethylhexyl adipate, dialkyl (the number of carbon atoms in the alkyl group=13) adipate, dioctyl sebacate, diethyl azelate and didecyl maleate.

Among these, the esters of the aliphatic dicarboxylic acid with the alkoxy group-containing monool, such as diethoxyethyl adipate, diethoxyethoxyethyl adipate, dibutoxyethoxyethyl adipate and dibutoxyethyl adipate are preferred.

The number average molecular weight of the polyoxyalkylene monoalkyl ethers forming the "monoesters of a polyoxyalkylene monoalkyl ether with a monocarboxylic acid" is generally 100 to 1,500, preferably 150 to 1,000.

Examples of the monocarboxylic acid forming the monoesters include monocarboxylic acids having 1 to 10 carbon atoms, such as formic acid, acetic acid, propionic acid, butanoic acid, benzoic acid and 2-ethylhexanoic acid.

Specific preferable examples of the monoesters include methoxy PEG 400 acetate, methoxy PEG 1000 benzoate and butoxy PEPG (butoxy-terminated EO/PO random addition polyether) 2-ethylhexanoate.

Examples of monools forming the "trimellitic triesters" include those exemplified above as those forming the aliphatic dicarboxylic diesters.

Specific preferable examples of the trimellitic triesters include tris(2-ethylhexyl) trimellitate, tridecyl trimellitate and tris(butyl diglycol) trimellitate.

Specific preferable examples of the "aliphatic phosphoric esters" include trimethyl phosphate, triethyl phosphate, tributyl phosphate, tri-2-ethylhexyl phosphate and tributoxybutyl phosphate.

Specific preferable examples of the "aromatic phosphoric esters" include triphenyl phosphate, tricresyl phosphate, trixylenyl phosphate, cresyldiphenyl phosphate, xylenyldiphenyl phosphate, 2-ethylhexyldiphenyl phosphate and tris(2,6-dimethylphenyl) phosphate.

Specific preferable examples of the "halogen-containing aliphatic phosphoric esters" include tris(chloroethyl) phosphate, tris(β-chloropropyl) phosphate, tris(dichloropropyl) phosphate and tris(tribromoneopentyl) phosphate.

Among the ester compounds constituting the plasticizer (b2), the monocarboxylic monoesters of PEG, the monocarboxylic diesters of PEG, the aliphatic dicarboxylic diesters, the monoesters of a polyoxyalkylene monoalkyl ether with a monocarboxylic acid and the trimellitic triesters are preferred.

Since these ester compounds (particularly, the aliphatic dicarboxylic diesters obtained from a aliphatic dicarboxylic acid and an alkoxy group-containing monool) are high in affinity for the thermoplastic polyurethane-urea resin (A) and easy to penetrate into the resin, colored resin powder good in blocking resistance can be obtained, and a molded product obtained by using such colored resin powder is advantageous in causing less bleeding-out of the plasticizer (i.e., having good blooming resistance). In particular, even when a relatively great amount of the alkoxy group-containing aliphatic dicarboxylic diester is used to produce colored resin powder, molded products obtained from such colored resin powder become far excellent in blooming resistance (see Example 13 and Example 15 given below).

The colored paste (B) is prepared by mixing the colorant (b1) with the plasticizer (b2).

Specifically, the paste is prepared by adding the colorant (b1) to the plasticizer (b2) and mixing both components by means of a roll mill, media mixer, planetary mixer or the like.

When the colored paste (B) is prepared by a circulating system, the mixing is carried out by passing the colorant (b1) and the plasticizer (b2) through a static mixer or, as needed, through a plurality of static mixers as needed. Incidentally, when the viscosity of the plasticizer (b2) is high, or the proportion of the colorant (b1) is set high, the plasticizer (b2) may be heated. In order to improve the dispersion stability of the colorant (b1) in the colored paste (B), an optimum amount of a surfactant or the like may be added.

The mixing ratio "(b1)/(b2)" of the colorant (b1) to the plasticizer (b2) is generally 0.5/99.5 to 40/60 (by mass), preferably 0.5/99.5 to 30/70, more preferably 0.5/99.5 to 20/80.

If the ratio (b1)/(b2) is lower than 0.5/99.5 (i.e., the amount of the colorant (b1) is too small), it is difficult to uniformly disperse the colorant (b1). In addition, it requires a greater amount of the plasticizer in order to make the proportion of the colorant (b1) to the thermoplastic polyurethane-urea resin (A) a certain value or higher, so that a molded product obtained by using the resultant colored resin powder tends to have deteriorated characteristics in mechanical properties and the like.

If the ratio (b1)/(b2) exceeds 40/60 (i.e., the amount of the colorant (b1) is too great) on the other hand, the viscosity of the resulting colored paste becomes too high, so that the thermoplastic polyurethane-urea resin (A) cannot be uniformly colored by such colored paste. This results in such problems that color mottling occurs on the resulting colored resin powder, or that dotted smears are caused on the resulting molded product by aggregates of the colorant (b1) separated from such colored resin powder (see Comparative Examples 2 to 4 given below).

The dispersed state of the colorant (b1) in the colored paste (B) prepared in the above-described manner is preferably such that the degree of dispersion as measured by a grind gauge is within 5 times the primary particle diameter (generally 10 μm or smaller) of the colorant.

The viscosity (at 25° C.) of the colored paste (B) is preferably lower than 800 mPa·s, more preferably lower than 650 mPa·s, particularly preferably lower than 500 mPa·s. No particular limitation is imposed on the lower limit of the viscosity (at 25° C.) of the colored paste (B). When a colored paste (B) having a low viscosity is left to stand, however, there is a possibility that the colorant (b1) and the plasticizer (b2) may separate from each other. In this case, the performances at the initial dispersed state can be restored by stirring the colored paste (B) (or shaking a container containing the paste).

<Coloring Step>

The coloring step in the production process according to the present invention is a step of adding and mixing the colored paste (B) into the thermoplastic polyurethane-urea resin (A), thereby producing colored resin powder.

Specifically, the thermoplastic polyurethane-urea resin (A) is introduced into a high-speed stirring and mixing device such as a Henschel mixer or Super mixer, the colored paste (B) is gradually added dropwise thereto while stirring at 200 to 4,000 rpm, and stirring and mixing are continued after completion of the dropwise addition.

From the viewpoint of preventing the generation of aggregates of the colorant (b1), it is preferred that the colored paste (B) is not introduced collectively into the high-speed stirring and mixing device, but gradually added dropwise under stirring conditions. The time for the stirring and mixing time varies depending on the amounts charged. However, the time is preferably from 30 seconds to 10 minutes, more preferably from 30 seconds to 5 minutes. If the stirring and mixing time is too long, the colorant (b1) adhered to the surface of the thermoplastic polyurethane-urea resin (A) separates and falls. This makes it difficult to obtain uniformly colored resin powder, and serves as the cause of the generation of aggregates of the colorant (b1).

The stirring and mixing may be carried out at normal temperature. However, the components may be heated (at, for example, 50 to 100° C.) depending on the kind of the plasticizer (b2) constituting the colored paste (B), thereby improving the penetrability of the plasticizer (b2) into the thermoplastic polyurethane-urea resin (A).

After completion of the stirring and mixing, the resultant colored resin powder is taken out of the high-speed stirring and mixing device and preferably stored in a closable container to leave it at rest for 1 to 30 hours in the container. The plasticizer (b2) is thereby absorbed in the interior of the resin (thermoplastic polyurethane-urea resin (A)) constituting the colored resin powder.

In the coloring step, the mixing ratio of the thermoplastic polyurethane-urea resin (A) to the colored paste (B) is such that when the mass of the thermoplastic polyurethane-urea resin (A) is represented by "MA", the mass of the colorant (b1) contained in the colored paste (B) is represented by "Mb1" and the mass of the plasticizer (b2) contained in the colored paste (B) is represented by "Mb2", "Mb1/MA" is 0.1/100 to 5/100, and "Mb2/MA" is 1/100 to 20/100.

"Mb1/MA" is generally, 0.1/100 to 5/100, preferably 0.2/100 to 4/100, more preferably 0.3/100 to 4/100.

If "Mb1/MA" is lower than 0.1/100 (i.e., the amount of the colorant to the resin is too small), uniformly colored resin powder cannot be obtained. In addition, when such colored resin powder is used to mold it, the color of the resultant molded product becomes light, thereby causing problems of color missing (lack of opacifying property) and the like.

If "Mb1/MA" exceeds 5/100 (i.e., the amount of the colorant to the resin is too great) on the other hand, uniformly colored resin powder cannot be obtained due to the colorant that cannot be attached to the surface of the thermoplastic polyurethane-urea resin (A), so that color mottling occurs on the resulting colored resin powder, dotted smears occur on a molded product to be obtained due to aggregates of the colorant (b1) separated and fallen from such colored resin powder, or the color fastness of the molded product is greatly lowered (see Comparative Example 2 given below).

"Mb2/MA" is generally, 1/100 to 20/100, preferably 2/100 to 16/100, particularly preferably 3/100 to 12/100.

If "Mb2/MA" is lower than 1/100 (i.e., the amount of the plasticizer to the resin is too small), the colorant (b1) readily falls from the surface of the thermoplastic polyurethane-urea resin (A) upon a molding step or the like, so that color mottling (dotted smears) occurs on the resulting molded product, or the color fastness of the molded product is lowered.

If "Mb2/MA" exceeds 20/100 (i.e., the amount of the plasticizer to the resin is too great) on the other hand, the blocking resistance of the resulting colored resin powder is deteriorated due to an excess amount of the plasticizer that is not absorbed in the thermoplastic polyurethane-urea resin (A). In addition, in a molding step using such colored resin powder, smoke or offensive odor may be emitted in some cases. Further, the resulting molded product is markedly deteriorated in mechanical properties, abrasion resistance, blooming resistance and the like due to an excess amount of the plasticizer (see Comparative Example 1 given below).

EXAMPLES

The present invention will hereinafter be described by the following Examples. However, the present invention is not limited thereto. Incidentally, all designations of "part" or "parts" used in the following examples are given by mass.

Resin Preparation Example

Powdery thermoplastic polyurethane-urea resin (A) was prepared in the following manner in accordance with the process described in Example 1 of Japanese Patent Application No. 2005-311076.

A 2-L reactor equipped with a stirrer, a thermometer, a distilling column and a nitrogen gas inlet pipe was charged with 762 g of adipic acid, 49 g of maleic anhydride and 386 g of ethylene glycol, and the contents were stirred under conditions of 150° C. and normal pressure while introducing nitrogen gas, thereby conducting an esterification reaction.

At the time when condensation water disappeared, 0.1 g of tetrabutyl titanate was added, the pressure within the reaction system was gradually reduced to 0.07 kPa, the temperature was gradually raised to 190° C. to continue the reaction, thereby obtaining a polyester. The number average molecular weight of the resultant polyester was 2,000, and the iodine value thereof was 12.7 gI/100 g.

A 500-mL reactor equipped with a stirrer, a thermometer, a distilling column and a nitrogen gas inlet pipe was then charged with 74 g of the polyester and 150 g of butyl acetate, and the contents were heated to 110° C. and stirred while introducing nitrogen gas. Thereafter, a solution mixture of 75 g of 2-ethylhexyl methacrylate and 1 g of benzoyl peroxide was added dropwise thereto from a dropping funnel over 1 hour. After completion of the dropwise addition, the contents were heated to 130° C. and caused to react for additional 2 hours, thereby obtaining a dispersant solution having a solid content of 50%.

A 3-L reactor equipped with a stirrer, a thermometer, a condenser and a nitrogen gas inlet pipe was charged with 170.2 g of a polyester diol (PBA-1000) obtained from 1,4-BD and adipic acid and having a number average molecular weight of 1,000, 255.3 g of a polyester diol (PBEA-2600) obtained from 1,4-BD, ethylene glycol and adipic acid and having a number average molecular weight of 2,600, 255.3 g of a polyester diol (PHiP-1000) obtained from 1,6-HD and isophthalic acid and having a number average molecular weight of 1,000, 170.2 g of a polyester diol (PHoP-1500) obtained from 1,6-HD and orthophthalic acid and having a number average molecular weight of 1,500, 9.23 g of di-2-ethylhexyl-amine (D-2EHA), and 18.4 g of the dispersant solution and 670.6 g of isooctane "Kyowasol C-800" (product of KYOWA HAKKO CHEMICAL CO., LTD.), and the contents were stirred at 90 to 95° C. for 1 hour, thereby dispersing the high-molecular weight polyols (PBA-1000, PBEA-2600, PHiP-1000 and PHoP-1500) in isooctane to prepare a non-aqueous liquid dispersion.

To the thus-obtained liquid dispersion of the high-molecular weight polyols, were added 139.3 g of hexamethylene diisocyanate (HDI) and 0.050 g of a bismuth catalyst "NEOSTANN U-600" (product of NITTO KASEI CO., LTD.), and the system was allowed to react at 90 to 95° C. for 3 hours.

Then, 2.41 g of 1,4-BD and 1.36 g of 1,6-HD were added thereto to conduct a reaction at 65 to 70° C., thereby forming an isocyanate group-terminated prepolymer and thus preparing a liquid dispersion thereof.

To the thus-obtained liquid dispersion of the isocyanate group-terminated prepolymer, was added 24.1 g of water to subject the isocyanate group-terminated prepolymer and water to a chain extending reaction at 65 to 70° C. until the isocyanate group was consumed, thereby forming a polyurethane-urea resin and thus preparing a liquid dispersion thereof.

Solids (polyurethane-urea resin) were separated by filtration from the thus-obtained liquid dispersion of the polyurethane-urea resin. After 0.25 g of an antioxidant "Irganox 245" (product of Ciba Specialty Chemicals K.K.), 0.15 g of an ultraviolet absorbent "Chinubin 213" (product of Ciba Specialty Chemicals K.K.), 0.15 g of a light stabilizer "Chinubin 765" (product of Ciba Specialty Chemicals K.K.) and 0.20 g of an internal parting agent "SH200-100,000 cs" (product of Dow Corning Toray Co., Ltd.) were added to the solids, and the resultant mixture was dried, 0.30 g of a dusty agent "MP1451" (product of Soken Chemical & Engineering Co., Ltd.) was added, thereby preparing a powdery thermoplastic polyurethane-urea resin (A). The thus-obtained resin was truly spherical and had an angle of repose of 26° and an average particle diameter of 135 μm.

Example 1

Mixing of Colorants

A hundred g of a black colorant (b1) "PV-817" (product of Sumika Color Co., Ltd.) obtained by mixing 40% by mass of carbon black which is a powder pigment (b1-1) with 60% by mass of calcium carbonate which is a pigment dispersant (b1-2) was mixed with 600 g a white colorant (b1) "PV-7A1301" (product of Sumika Color Co., Ltd.) obtained by mixing 70% by mass of titanium oxide which is a powder pigment (b1-1) with 30% by mass of calcium carbonate which is a pigment dispersant (b1-2) by means of a Henschel mixer (manufactured by Mitsui Mining Co., Ltd.) for 10 minutes at 3,000 rpm. The maximum value of a primary particle diameter of the mixture thus obtained was 0.8 μm.

Preparation of Colored Paste

Then, 350 g of the above-obtained mixture of the colorants (b1) was weighed and added to 1,500 g of PEG 400 dibenzoate which is a plasticizer (b2), and they were mixed at 40° C. for 15 minutes by means of a mixing device equipped with a static mixer and a circulating pump, thereby preparing a colored paste (B). The concentration of the colorants (b1) in the thus-obtained colored paste (B) was 18.9% and the degree of dispersion of the colorants (b1) as measured by a grind gauge was 3 µm.

Preparation of Colored Resin Powder

A thousand g (100 parts) of the thermoplastic polyurethane-urea resin (A) obtained in the Resin Preparation Example was Introduced into a Henschel mixer (manufactured by Mitsui Mining Co., Ltd.), 37.0 g (3.70 parts) of the colored paste (B) obtained above was gradually added dropwise thereto while stirring at 2,000 rpm, and both components were then stirred and mixed for 3 minutes at 2,000 rpm, thereby preparing colored resin powder. Incidentally, upon the mixing, the temperature of the interior was raised to 45° C. by spontaneous heat generation. The resultant colored resin powder was then taken out of the Henschel mixer and stored in a closable container to leave it at rest for 6 hours at normal temperature. In this example, the amount of the mixture of the colorants (b1) used was 0.700 part ("PV-817"=0.100 part, "PV-7A1301"=0.600 part), and the amount of the plasticizer used was 3.0 parts, each per 100 parts of the thermoplastic polyurethane-urea resin (A).

Examples 2 to 8

In the same manner as in Example 1 except that the amounts of the colorants (b1) and/or plasticizer (b2) used were changed in accordance with their corresponding formulations [concentrations of the colorants (b1) in respective colored pastes (B), and proportions of the colorants (b1) and plasticizer (b2) used per 100 parts of the thermoplastic polyurethane-urea resin (A)] shown in the following Table 1, the colorants were mixed, colored pastes (B) were prepared, colored resin powders were prepared, and each of the resultant colored resin powders was taken out of the Henschel mixer and stored in a closable container to leave it at rest for 6 hours at normal temperature.

Comparative Examples 1 to 4

In the same manner as in Example 1 except that the amounts of the colorants (b1) and/or plasticizer (b2) used were changed in accordance with their corresponding formulations [concentrations of the colorants (b1) in respective colored pastes (B), and proportions of the colorants (b1) and plasticizer (b2) used per 100 parts of the thermoplastic polyurethane-urea resin (A)] shown in the following Table 2, the colorants were mixed, colored pastes (B) were prepared, colored resin powders were prepared, and each of the resultant colored resin powders was taken out of the Henschel mixer and stored in a closable container to leave it at rest for 6 hours at normal temperature.

Comparative Example 5

A thousand g (100 parts) of the thermoplastic polyurethane-urea resin (A) was introduced into a Henschel mixer in accordance with the formulation shown in the following Table 2, 7.0 g (0.700 part) of a mixture (PV-817:PV-7A1301=0.100:0.600) of the colorants (b1) was gradually added thereto while stirring at 2,000 rpm, and both components were then stirred and mixed for 3 minutes at 2,000 rpm, thereby preparing colored resin powder. The resultant colored resin powder was taken out of the Henschel mixer and stored in a closable container.

Comparative Example 6

A thousand g (100 parts) of the thermoplastic polyurethane-urea resin (A), 7.0 g (0.700 part) of a mixture (PV-817: PV-7A1301=0.100:0.600) of the colorants (b1) and 30.0 g (3.0 parts) of PEG 400 dibenzoate were introduced into a Henschel mixer in accordance with the formulation shown in the following Table 2, and the contents were stirred and mixed for 3 minutes at 2,000 rpm, thereby preparing colored resin powder. The resultant colored resin powder was taken out of the Henschel mixer and stored in a closable container to leave it at rest for 6 hours at normal temperature.

Comparative Example 7

A thousand g (100 parts) of the thermoplastic polyurethane-urea resin (A) was introduced into a Henschel mixer in accordance with the formulation shown in the following Table 2, 30.0 g (3.0 parts) of the plasticizer (b2) was gradually added thereto while stirring at 2,000 rpm, the contents were then stirred and mixed for 3 minutes at 2,000 rpm, 7.0 g (0.700 part) of a mixture (PV-817:PV-7A1301=0.100:0.600) of the colorants (b1) was gradually added while stirring, and the contents were then stirred and mixed for 3 minutes at 2,000 rpm, thereby preparing colored resin powder. The resultant colored resin powder was taken out of the Henschel mixer and stored in a closable container to leave it at rest for 6 hours at normal temperature.

Comparative Example 8

A thousand g (100 parts) of the thermoplastic polyurethane-urea resin (A) and 7.0 g (0.700 part) of a mixture (PV-817:PV-7A1301=0.100:0.600) of the colorants (b1) were introduced into a Henschel mixer in accordance with the formulation shown in the following Table 2, and the contents were stirred and mixed for 2 minutes at 1,500 rpm. Then, 30.0 g (3.0 parts) of the plasticizer (b2) was added thereto, and the contents were then stirred and mixed for 3 minutes at 2,500 rpm, thereby preparing colored resin powder. The resultant colored resin powder was taken out of the Henschel mixer and stored in a closable container to leave it at rest for 6 hours at normal temperature.

Examples 9 to 12, Example 14 and Examples 16 to 22

A hundred g of the black colorant (b1) "PV-817" was mixed with 600 g of the white colorant (b1) "PV-7A1301" in the same manner as in Example 1.

Colored pastes (B) were then prepared in the same manner as in Example 1 except that 350 g of the above-obtained mixture of the colorants (b1) was weighed and added to 1,500 g of each of plasticizers (b2) shown in Table 3 and Table 4. The concentration of the colorants (b1) in each of these colored pastes (B) was 18.9% and the degree of dispersion of the colorants (b1) as measured by a grind gauge was 3 µm.

Colored resin powders were then prepared in the same manner as in Example 1 except that 1,000 g (100 parts) of the thermoplastic polyurethane-urea resin (A) obtained in the Resin Preparation Example was introduced into a Henschel mixer, and 37.0 g (3.70 parts) of the respective colored pastes (B) were gradually added dropwise thereto while stirring at 2,000 rpm. Each of the resultant colored resin powders was taken out of the Henschel mixer and stored in a closable container to leave it at rest for 6 hours at normal temperature.

Example 13

In the same manner as in Example 12 except that the used amount of dibutoxyethoxyethyl adipate which is a plasticizer (b2) was changed in accordance with the formulation shown in the following Table 3, the colorants were mixed, a colored paste (B) was prepared, colored resin powder was prepared, and the resultant colored resin powder was taken out of the Henschel mixer and stored in a closable container to leave it at rest for 6 hours at normal temperature.

Example 15

In the same manner as in Example 14 except that the used amount of dibutoxyethyl adipate which is a plasticizer (b2) was changed in accordance with the formulation shown in the following Table 3, the colorants were mixed, a colored paste (B) was prepared, colored resin powder was prepared, and the resultant colored resin powder was taken out of the Henschel mixer and stored in a closable container to leave it at rest for 6 hours at normal temperature.

<Evaluation of Colored Resin Powder>

With respect to the respective colored resin powders obtained in Examples 1 to 22 and Comparative Examples 1 to 8, measurement and evaluation were made as to the following items. The results are shown collectively in Table 1 to Table 4.

(1) Bulk Specific Gravity of Colored Resin Powder:
Measurement was made by means of a "bulk hydrometer" in accordance with JIS-K 6720.

(2) Blocking Resistance of Colored Resin Powder:
A hundred g of a colored resin powder sample was placed on a sieve having a sieve opening size of 1,000 µm to measure the mass of powder passed through the sieve. Evaluation was made in accordance with the following criteria.

(Evaluation Criteria)

"AA": Not less than 99 g;

"A": Not less than 97 g, but less than 99 g;

"B": Not less than 95 g, but less than 97 g;

"C": Not less than 90 g, but less than 95 g;

"CC": Less than 90 g.

(3) Surface Condition (The State of Occurrence of Color Mottling) of Colored Resin Powder:
The surface of a colored resin powder sample was visually observed to make evaluation in accordance with the following criteria.

(Evaluation Criteria)

"AA": Not observed;

"A": Slightly observed;

"B": Observed;

"C": Clearly observed;

"CC": Markedly observed.

(4) The State of Emission of Smoke and/or Offensive Odor upon melting:
A molded sheet having a thickness of 1 mm was produced by slush molding, in which a rotary slush molding machine was used to heat and melt a colored resin powder sample for 10 seconds in a mold heated to 230° C., unmelted powder was removed, the molten powder was left to stand for 45 seconds in an electric furnace of 300° C., and a molded product was water-cooled. At this time, in the electric furnace, the state of emission of smoke and/or offensive odor derived from the plasticizer was evaluated in accordance with the following criteria.

(Evaluation Criteria)

"AA": Not observed;

"A": Slightly observed;

"B": Observed;

"C": Clearly observed;

"CC": Markedly observed.

(5) Developability of green strength upon release from mold:
The presence and degree of deformation upon release of a sheet obtained by the same slush molding as in the item (4) from the mold were visually observed to make evaluation in accordance with the following criteria.

(Evaluation Criteria)

"AA": Deformation was not observed;

"A": Deformation was slightly observed;

"B": Deformation was observed;

"C": Deformation was clearly observed;

"CC": Deformation was markedly observed.

(6) Mechanical properties of molded product:
With respect to a sheet obtained by the same slush molding as in the item (4), tensile test and tear test were conducted in accordance with JIS K 6251 and 6252 to measure tensile strength, elongation at break and tear strength.

(7) Abrasion Resistance of Molded Product:
With respect to a sheet obtained by the same slush molding as in the item (4), a test of 100 reciprocating cycles was conducted under the following conditions by means of a reciprocating surface abrasion tester to visually observe the conditions of the surface of the sheet, and evaluated in accordance with the criteria shown below.

(Conditions)
Reciprocating speed=40 times/min
Friction element: 30 mm×12 mm
Load=29.4 N
Abrading material: that obtained by laminating 5 sheets of white cotton shirting No. 3.

(Evaluation Criteria)

"AA": Damage was not observed;

"A": Damage was somewhat observed in an inconspicuous degree;

"C": Damage was observed;

"C": Damage was clearly observed;

"CC": Damage was markedly observed.

(8) Color Fastness of Molded Product:
Color stain of the abrading material (white cotton shirting fabric) after the abrasion test in the item (7) was evaluated in accordance with the following criteria.

(Evaluation Criteria)

"AA": Color stain was not observed;

"A": Color stain was slightly observed;

"B": Color stain was observed, but allowable;

"C": Color stain was clearly observed (not allowable);

"CC": Color stain was markedly observed.

(9) Surface Condition of a Molded Product of the Fiftieth Shot:

The surface condition of a molded product obtained in the fiftieth shot of the slush molding in the item (4) was visually observed to visually observe the presence and degree of dotted smears (caused by aggregates of the colorants separated from the colored resin powder), and evaluated in accordance with the following criteria.

(Evaluation Criteria)

"AA": Not observed;

"A": Slightly observed;

"B": Observed;

"C": Clearly observed;

"CC": Markedly observed.

(10) Adhesion Property to Polyurethane Foam:

A sheet obtained by the same slush molding as in the item (4) was arranged in a foaming mold in such a manner that one surface thereof came into close contact with a foam, a composition for forming a semi-rigid polyurethane foam was charged into this mold, and the resultant product was released from the mold after 2 minutes from the charging. After the molded product was left to stand for 24 hours under an atmosphere of 25° C., the sheet was instantaneously peeled from the foam thus formed, and the separated surfaces were visually observed to determine an area proportion of a portion which underwent interfacial (boundary) separation, and the adhesion property of the sheet was evaluated in accordance with the criteria shown below. In this test, the foaming conditions are as follows: mold temperature=35° C., OAD=200 kg/m$^3$ and packing rate=120%.

"AA": 0%;

"A": Lower than 1%;

"B": Not lower than 1%, but lower than 3%;

"C": Not lower than 3%, but lower than 10%;

"CC": Not lower than 10%.

(11) Blooming resistance of molded product:

After a sheet obtained by the same slush molding as in the item (4) was immersed for 48 hours in water of 50° C., this sheet was dried to visually observe the presence and degree of blooming on the surface thereof, evaluation was made in accordance with the following criteria.

(Evaluation Criteria)

"AA": Not observed;

"A": Slightly observed;

"B": Observed;

"C": Clearly observed;

"CC": Markedly observed.

TABLE 1

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Thermoplastic polyurethane-urea resin (A) [part] | | | 100 | 100 | 100 | 100 | 100 | 100 | 100 | 100 |
| Colored paste (B) | Colorant (b1) | PV-817 (black) [part] | 0.100 | 0.100 | 0.100 | 0.100 | 0.014 | 0.714 | 0.714 | 0.014 |
| | | PV-7A1301 (white) [part] | 0.600 | 0.600 | 0.600 | 0.600 | 0.086 | 4.286 | 4.286 | 0.086 |
| | Plasticizer (b2) | PEG 400 dibenzoate [part] | 3.0 | 20.0 | 1.05 | 10.0 | 3.0 | 10.0 | 7.5 | 20.0 |
| | Concentration of colorants in paste [%] | | 18.9 | 3.4 | 40.0 | 6.5 | 3.2 | 33.3 | 40.0 | 0.5 |
| Colored resin powder | Bulk specific gravity (JIS K 6720) | | 0.76 | 0.70 | 0.78 | 0.74 | 0.73 | 0.79 | 0.78 | 0.70 |
| | Blocking resistance | | AA | A | AA | AA | AA | AA | AA | A |
| | Colored state of surface (state of occurrence of color mottling) | | AA | AA | A | AA | A | AA | A | AA |
| Melt-moldability | State of emission of smoke•offensive odor upon melting | | AA | A | AA | AA | AA | AA | AA | A |
| | Developability of green strength upon release from mold | | AA | A | AA | AA | AA | AA | AA | A |
| Mechanical properties of molded product | Tensile strength [MPa] | | 14 | 11 | 15 | 13 | 14 | 13 | 13 | 11 |
| | Elongation at break [%] | | 580 | 400 | 570 | 500 | 560 | 480 | 510 | 420 |
| | Tear strength [kN/m] | | 54 | 40 | 55 | 50 | 52 | 51 | 50 | 45 |
| Durability or molded product | Abrasion resistance | | AA | A | AA | AA | AA | AA | AA | A |
| | Color fastness | | AA | AA | AA | AA | AA | A | A | AA |
| Surface condition of molded product of the 50-th shot | | | AA | AA | A | AA | AA | A | A | AA |
| Adhesion property to polyurethane foam | | | AA | A | AA | AA | AA | A | A | A |
| Blooming resistance | | | AA | A | AA | A | AA | A | AA | A |

TABLE 2

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Thermoplastic polyurethane-urea resin (A) [part] | | | 100 | 100 | 100 | 100 | 100 | 100 | 100 | 100 |
| Colored paste (B) | Colorant (b1) | PV-817 (black) [part] | 0.100 | 1.140 | 0.057 | 0.143 | 0.100 | 0.100 | 0.100 | 0.100 |
| | | PV-7A1301 (white) [part] | 0.600 | 6.860 | 0.340 | 0.857 | 0.600 | 0.600 | 0.600 | 0.600 |
| | Plasticizer (b2) | PEG 400 dibenzoate [part] | 25.0 | 3.0 | 0.5 | 1.0 | — | 3.0 | 3.0 | 3.0 |
| | Concentration of colorants in paste [%] | | 2.7 | 72.7 | 44.4 | 50.0 | — | — | — | — |
| Colored resin powder | Bulk specific gravity (JIS K 6720) | | 0.67 | 0.79 | 0.77 | 0.76 | 0.77 | 0.75 | 0.76 | 0.76 |
| | Blocking resistance | | C | AA | AA | AA | AA | AA | AA | C |
| | Colored state of surface (state of occurrence of color mottling) | | AA | CC | C | CC | C | CC | CC | CC |

TABLE 2-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Melt-moldability | State of emission of smoke•offensive odor upon melting | C | AA | AA | AA | AA | AA | AA | AA |
|  | Developability of green strength upon release from mold | A | AA | AA | AA | AA | AA | AA | AA |
| Mechanical properties of molded product | Tensile strength [MPa] | 8 | 11 | 14 | 13 | 15 | 13 | 13 | 14 |
|  | Elongation at break [%] | 250 | 450 | 600 | 570 | 600 | 560 | 570 | 550 |
|  | Tear strength [kN/m] | 30 | 48 | 57 | 54 | 55 | 52 | 53 | 54 |
| Durability of molded product | Abrasion resistance | C | AA | AA | AA | AA | AA | AA | AA |
|  | Color fastness | A | CC | AA | AA | C | AA | AA | AA |
| Surface condition of molded product of the 50-th shot |  | AA | CC | CC | C | CC | C | C | C |
| Adhesion property to polyurethane foam |  | C | AA | AA | AA | AA | AA | AA | AA |
| Blooming resistance |  | C | AA | AA | AA | AA | AA | AA | AA |

TABLE 3

|  |  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Thermoplastic polyurethane-urea resin (A) [part] |  |  | 100 | 100 | 100 | 100 | 100 | 100 | 100 | 100 |
| Colored paste (B) | Colorant (b1) | PV-817 (black) [part] | 0.100 | 0.100 | 0.100 | 0.100 | 0.100 | 0.100 | 0.100 | 0.100 |
|  |  | PV-7A1301 (white) [part] | 0.600 | 0.600 | 0.600 | 0.600 | 0.600 | 0.600 | 0.600 | 0.600 |
|  | Plasticizer (b2) | PEG 200 dibenzoate [part] | 3.0 |  |  |  |  |  |  |  |
|  |  | PEG 600 dibenzoate [part] |  | 3.0 |  |  |  |  |  |  |
|  |  | PEG 1000 dibenzoate [part] |  |  | 3.0 |  |  |  |  |  |
|  |  | Dibutoxyethoxyethyl adipate [part] |  |  |  | 3.0 | 20.0 |  |  |  |
|  |  | Dibutoxyethyl adipate [part] |  |  |  |  |  | 3.0 | 20.0 |  |
|  |  | Diisononyl adipate [part] |  |  |  |  |  |  |  | 3.0 |
|  |  | Concentration of colorants in paste [%] | 18.9 | 18.9 | 18.9 | 18.9 | 3.4 | 18.9 | 3.4 | 18.9 |
| Colored resin powder | Bulk specific gravity (JIS K 6720) |  | 0.78 | 0.75 | 0.74 | 0.78 | 0.71 | 0.77 | 0.70 | 0.76 |
|  | Blocking resistance |  | AA | AA | A | AA | AA | AA | AA | AA |
|  | Colored state of surface (state of occurrence of color mottling) |  | AA | AA | AA | AA | AA | AA | AA | AA |
| Melt-moldability | State of emission of smoke•offensive odor upon melting |  | AA | AA | AA | AA | AA | AA | AA | AA |
|  | Developability of green strength upon release from mold |  | AA | AA | AA | AA | AA | AA | AA | AA |
| Mechanical properties of molded product | Tensile strength [MPa] |  | 15 | 14 | 14 | 13 | 10 | 14 | 11 | 12 |
|  | Elongation at break [%] |  | 500 | 550 | 530 | 540 | 410 | 500 | 400 | 560 |
|  | Tear strength [kN/m] |  | 50 | 52 | 51 | 50 | 40 | 52 | 42 | 51 |
| Durability of molded product | Abrasion resistance |  | AA | AA | AA | AA | AA | AA | AA | AA |
|  | Color fastness |  | AA | AA | AA | AA | AA | AA | AA | AA |
| Surface condition of molded product of the 50-th shot |  |  | AA | AA | AA | AA | AA | AA | AA | AA |
| Adhesion property to polyurethane foam |  |  | AA | AA | AA | AA | AA | AA | AA | AA |
| Blooming resistance |  |  | AA | AA | AA | AA | AA | AA | AA | AA |

TABLE 4

|  |  |  | Ex. 17 | Ex. 18 | Ex. 19 | Ex. 20 | Ex. 21 | Ex. 22 |
|---|---|---|---|---|---|---|---|---|
| Thermoplastic polyurethane-urea resin (A) [part] |  |  | 100 | 100 | 100 | 100 | 100 | 100 |
| Colored paste (B) | Colorant (b1) | PV-817 (black) [part] | 0.100 | 0.100 | 0.100 | 0.100 | 0.100 | 0.100 |
|  |  | PV-7A1301 (white) [part] | 0.600 | 0.600 | 0.600 | 0.600 | 0.600 | 0.600 |
|  | Plasticizer (b2) | Diisodecyl adipate [part] | 3.0 |  |  |  |  |  |
|  |  | Bis(butyl diglycol) adipate [part] |  | 3.0 |  |  |  |  |
|  |  | Tris(2-ethylhexyl) trimellitate [part] |  |  | 3.0 |  |  |  |
|  |  | Ester of polyoxyalkylene monoalkyl ether (Mn = 600) and acetic acid [part] |  |  |  | 3.0 |  |  |
|  |  | Di-2-ethylhexyl adipate [part] |  |  |  |  | 3.0 |  |
|  |  | Dialkyl(C13) adipate [part] |  |  |  |  |  | 3.0 |
|  |  | Concentration of colorants in paste [%] | 18.9 | 18.9 | 18.9 | 18.9 | 18.9 | 18.9 |
| Colored resin powder | Bulk specific gravity (JIS K 6720) |  | 0.75 | 0.76 | 0.73 | 0.74 | 0.77 | 0.74 |
|  | Blocking resistance |  | A | AA | AA | AA | AA | A |
|  | Colored state of surface (state of occurrence of color mottling) |  | AA | AA | AA | AA | AA | AA |

TABLE 4-continued

|  |  | Ex. 17 | Ex. 18 | Ex. 19 | Ex. 20 | Ex. 21 | Ex. 22 |
|---|---|---|---|---|---|---|---|
| Melt-moldability | State of emission of smoke•offensive odor upon melting | AA | AA | AA | AA | AA | AA |
|  | Developability of green strength upon release from mold | AA | AA | AA | AA | AA | AA |
| Mechanical properties of molded product | Tensile strength [MPa] | 11 | 13 | 14 | 13 | 16 | 12 |
|  | Elongation at break [%] | 520 | 500 | 510 | 510 | 550 | 480 |
|  | Tear strength [kN/m] | 49 | 50 | 53 | 54 | 51 | 49 |
| Durability of molded product | Abrasion resistance | AA | AA | AA | AA | AA | AA |
|  | Color fastness | AA | AA | AA | AA | AA | AA |
| Surface condition of molded product of the 50-th shot |  | AA | AA | AA | AA | AA | AA |
| Adhesion property to polyurethane foam |  | A | AA | AA | AA | AA | AA |
| Blooming resistance |  | AA | AA | AA | AA | AA | A |

INDUSTRIAL APPLICABILITY

The colored resin powder obtained by the production process according to the present invention is suitable for use as a powder material for slush molding. Slush-molded products of the colored resin powder are particularly suitable for interior materials for automobiles and also useful as materials for room furniture such as sofa.

The invention claimed is:

1. A production process of colored resin powder, comprising a coloring step of mixing 0.5 to 40% by mass of a colorant (b1) with 99.5 to 60% by mass of a non-phthalic acid plasticizer (b2) to prepare a colored paste (B) and adding and mixing the colored paste (B) into a powdery thermoplastic polyurethane-urea resin (A), wherein
the amounts of the colorant (b1) and the plasticizer (b2) contained in the colored paste (B) added to the powdery thermoplastic polyurethane-urea resin (A) are 0.1 to 5 parts by mass and 1 to 20 parts by mass, respectively, per 100 parts by mass of the thermoplastic polyurethane-urea resin.

2. The production process of colored resin powder according to claim 1, wherein the plasticizer (b2) is a monocarboxylic monoester or monocarboxylic diester of polyoxyethylene glycol.

3. The production process of colored resin powder according to claim 1, wherein the plasticizer (b2) is an aliphatic dicarboxylic diester.

4. The production process of colored resin powder according to claim 3, wherein the aliphatic dicarboxylic diester is an ester of an aliphatic dicarboxylic acid with an alkoxy group-containing monool.

5. The production process of colored resin powder according to claim 1, wherein the plasticizer (b2) is a monoester of a polyoxyalkylene monoalkyl ether with a monocarboxylic acid.

6. The production process of colored resin powder according to claim 1, wherein the plasticizer (b2) is a trimellitic triester.

* * * * *